US007111684B2

(12) United States Patent
Brothers et al.

(10) Patent No.: US 7,111,684 B2
(45) Date of Patent: Sep. 26, 2006

(54) SUBTERRANEAN FLUIDS HAVING IMPROVED ENVIRONMENTAL CHARACTERISTICS AND METHODS OF USING THESE FLUIDS IN SUBTERRANEAN FORMATIONS

(75) Inventors: Lance E. Brothers, Chickasha, OK (US); Jeffrey J. Miller, Tomball, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/940,921

(22) Filed: Sep. 14, 2004

(65) Prior Publication Data

US 2006/0054320 A1   Mar. 16, 2006

(51) Int. Cl.
*E21B 33/138* (2006.01)
(52) U.S. Cl. .................... 166/294; 166/300; 175/70
(58) Field of Classification Search .............. None
See application file for complete search history.

(56) References Cited

U.S. PATENT DOCUMENTS

| | | | |
|---|---|---|---|
| 4,806,164 A | 2/1989 | Brothers .............. | 106/90 |
| 4,941,536 A | 7/1990 | Brothers et al. ....... | 166/293 |
| 5,049,288 A | 9/1991 | Brothers et al. ....... | 252/8.551 |
| 5,252,554 A | 10/1993 | Mueller et al. ........ | 507/138 |
| 5,295,543 A | 3/1994 | Terry et al. ........... | 166/293 |
| 5,327,968 A | 7/1994 | Onan et al. ........... | 166/293 |
| 5,383,521 A | 1/1995 | Onan et al. ........... | 166/293 |
| 5,458,195 A | 10/1995 | Totten et al. .......... | 166/293 |
| 5,472,051 A | 12/1995 | Brothers et al. ....... | 166/293 |
| 5,635,457 A | 6/1997 | Van Slyke ............ | 507/103 |
| 5,837,655 A | 11/1998 | Halliday et al. ....... | 507/103 |
| 5,851,958 A | 12/1998 | Halliday et al. ....... | 507/103 |
| RE36,066 E | 1/1999 | Mueller et al. ........ | 507/138 |
| 5,900,053 A | 5/1999 | Brothers et al. ....... | 106/678 |
| 5,958,845 A | 9/1999 | Van Slyke ............ | 507/103 |
| 6,034,037 A | 3/2000 | Van Slyke ............ | 507/103 |
| 6,107,255 A | 8/2000 | Van Slyke ............ | 507/103 |
| 6,110,874 A | 8/2000 | Van Slyke ............ | 507/103 |
| 6,138,759 A | 10/2000 | Chatterji et al. ....... | 166/293 |
| 6,143,069 A | 11/2000 | Brothers et al. ....... | 106/678 |
| 6,159,907 A | 12/2000 | Van Slyke ............ | 507/203 |
| 6,244,343 B1 | 6/2001 | Brothers et al. ....... | 166/293 |
| 6,255,256 B1 | 7/2001 | Van Slyke ............ | 507/103 |
| 6,268,406 B1* | 7/2001 | Chatterji et al. ....... | 523/130 |
| 6,315,042 B1 | 11/2001 | Griffith et al. ........ | 166/291 |
| 6,332,921 B1 | 12/2001 | Brothers et al. ....... | 106/692 |
| 6,464,009 B1* | 10/2002 | Bland et al. .......... | 166/300 |
| 6,488,763 B1 | 12/2002 | Brothers et al. ....... | 106/692 |
| 6,524,384 B1 | 2/2003 | Griffith et al. ........ | 106/705 |
| 6,561,273 B1 | 5/2003 | Brothers et al. ....... | 166/294 |
| 6,562,876 B1* | 5/2003 | Ansmann et al. ...... | 516/77 |
| 6,601,647 B1 | 8/2003 | Brothers et al. ....... | 166/293 |
| 6,631,766 B1 | 10/2003 | Brothers et al. ....... | 166/293 |
| 6,648,961 B1 | 11/2003 | Brothers et al. ....... | 106/692 |
| 6,660,078 B1 | 12/2003 | Brothers et al. ....... | 106/705 |
| 6,666,268 B1 | 12/2003 | Griffith et al. ........ | 166/292 |
| 6,668,929 B1 | 12/2003 | Griffith et al. ........ | 166/292 |
| 6,689,208 B1 | 2/2004 | Brothers .............. | 106/794 |
| 6,716,282 B1 | 4/2004 | Griffith et al. ........ | 106/705 |
| 6,722,433 B1 | 4/2004 | Brothers et al. ....... | 166/288 |
| 2002/0035041 A1 | 3/2002 | Griffith et al. | |
| 2002/0125010 A1* | 9/2002 | Collins et al. ......... | 166/279 |
| 2003/0045434 A1 | 3/2003 | Brothers et al. ....... | 507/219 |
| 2003/0064897 A1 | 4/2003 | Kirsner et al. ........ | 507/100 |
| 2003/0116319 A1 | 6/2003 | Brothers et al. ....... | 166/287 |
| 2003/0144153 A1 | 7/2003 | Kirnser et al. ........ | 507/100 |
| 2004/0007163 A1 | 1/2004 | Brothers et al. ....... | 106/811 |
| 2004/0014609 A1 | 1/2004 | Dalmazzone et al. | |
| 2004/0167248 A1 | 8/2004 | Brothers et al. ....... | 523/130 |
| 2005/0034866 A1 | 2/2005 | Brothers et al. | |

FOREIGN PATENT DOCUMENTS

| | | |
|---|---|---|
| GB | 2 390 861 A | 1/2004 |
| WO | WO 95/26386 | 10/1995 |
| WO | WO 96/00253 | 1/1996 |

OTHER PUBLICATIONS

Foreign communication from a related counterpart application dated Jan. 25, 2006.
Halliburton brochure entitled "HR®-5 Cement Additive" dated 1998.
Halliburton brochure entitled "HR®-15 Cement Retarder" dated 1999.
Halliburton brochure entitled "HR®-25 Cement Retarder" dated 1999.

(Continued)

*Primary Examiner*—Zakiya W. Bates
(74) *Attorney, Agent, or Firm*—Craig W. Roddy; Baker Botts L.L.P.

(57) ABSTRACT

Subterranean fluids are provided that have improved environmental characteristics, and more particularly, subterranean fluids are provided that include a hydraulic cement in an invert emulsion. Methods of using such fluids in subterranean operations also are provided. An example of a method is a method of using a fluid in a subterranean formation. An example of a composition is a fluid comprising a hydraulic cement and an invert emulsion of an oleaginous fluid, a nonoleaginous fluid, and an emulsifying surfactant, wherein the emulsifying surfactant: has an $LC_{50}$ or $EC_{50}$ that is greater than about 10 milligrams/liter with respect to *Skeletonema costatum, Acartia tonsa, Scopthalmus maximus* (juvenile), or *Corophium volutator*; and demonstrates a biodegradability of: greater than about 70% biodegradation in 28 days when tested according to method OECD 301A or 301E; or greater than about 60% biodegradation in 28 days when tested according to method OECD 301B, 301C, 301F, or 306.

28 Claims, No Drawings

OTHER PUBLICATIONS

Halliburton brochure entitled "SCR-100 Cement Retarder" dated 1999.
TXI Material Safety Data Sheet printed from the internet on Sep. 7, 2004.
Claytone product bulletin entitled "Clayton®II-Organic Bentonite" brochure printed on Sep. 7, 2004.
Baroid Fluids Handbook, Chapter 13, Synthetics, revised Aug. 1, 1997.
OSPAR Commission, paper entitled "OSPAR Guidelines for Completing the Harmonised Offshore Chemical Notification Format (HOCNF)" dated 2002.

* cited by examiner

SUBTERRANEAN FLUIDS HAVING IMPROVED ENVIRONMENTAL CHARACTERISTICS AND METHODS OF USING THESE FLUIDS IN SUBTERRANEAN FORMATIONS

BACKGROUND OF THE INVENTION

The present invention relates to subterranean fluids having improved environmental characteristics, and more particularly, to subterranean fluids comprising a hydraulic cement and an invert emulsion, and methods of using such fluids in subterranean operations.

During the drilling of a well bore in a subterranean formation, a drilling fluid may be circulated through a drill pipe and drill bit into the well bore, and subsequently flow upward through the well bore to the surface. The drilling fluid functions, inter alia, to cool the drill bit, lubricate the rotating drill pipe to prevent it from sticking to the walls of the well bore, prevent blowouts by providing hydrostatic pressure to counteract the sudden entrance into the well bore of high pressure formation fluids, and remove drill cuttings from the well bore. While drilling fluids generally are not settable, e.g., they generally do not set into hard impermeable sealing masses when static, drilling fluids may increase in gel strength over time. Typically, after a well bore is drilled to a desired final depth, the drill pipe and drill bit are withdrawn from the well bore, and the drilling fluid is left therein so as to, inter alia, provide hydrostatic pressure on permeable formations penetrated by the well bore, thereby preventing the flow of formation fluids into the well bore.

After the well bore has been drilled to the desired depth, a common subsequent step in completing the well bore usually involves placing a pipe string, e.g., casing, into the well bore. Depending upon factors such as, inter alia, the depth of the well bore and any difficulties in placing the pipe string therein, the drilling fluid may remain relatively static in the well bore for an extended period of time, e.g., up to 2 weeks. During that time, the drilling fluid may progressively increase in gel strength whereby portions of the drilling fluid in the well bore may become increasingly difficult to displace.

Upon placement of the pipe string in the well bore, primary cementing typically is performed, whereby the pipe string disposed in the well bore is cemented by pumping a cement composition through the pipe string and into an annulus between the pipe string and the walls of the well bore, thereby displacing the drilling fluid in the annulus. However, if the drilling fluid has developed sufficient gel strength during its residence within the well bore, an operator may be unable to displace all of the drilling fluid with the cement composition. Accordingly, portions of the drilling fluid in the well bore may be bypassed by the cement composition. This is problematic because the drilling fluid generally is not settable; therefore, formation fluids may enter and flow along the well bore, which is highly undesirable.

Previous attempts to solve this problem have involved the development of settable spotting fluid compositions, inter alia, to displace drilling fluids from well bores promptly after their use. However, these methods have not met with success, as conventional settable spotting fluids commonly include blast furnace slag and other hydraulic components that may begin to set at relatively low temperatures, e.g., temperatures less than about 90° F. Also, certain slag-containing settable spotting fluids may be intolerant to cement-composition contamination, causing the settable spotting fluids to prematurely set upon contact with well cement.

Conventional settable spotting fluids also may have other problems including, but not limited to, undesirable instability as well as a general inability to develop significant compressive strength upon setting. For example, most conventional invert emulsions (e.g., oil-external emulsions) often become unstable within about one week after their formulation. This may be problematic because it may necessitate delaying the formulation of the invert emulsion until shortly before the placement of the spotting fluid in a subterranean formation. If an excessive amount of the invert emulsion is formed, it generally cannot be re-used and often is disposed of, which disposal may further increase the cost of a particular job. Furthermore, the general inability of most conventional settable spotting fluids to develop significant compressive strength upon setting also may be problematic, because, inter alia, where formation fluids are present under a pressure sufficient to overcome the settable spotting fluid's low compressive strength, such formation fluids may continue to enter into and flow along the well bore, which is undesirable and defeats one of the major purposes of using settable spotting fluids—zonal isolation.

Still further, certain conventional settable spotting fluids may be environmentally undesirable, particularly in highly regulated regions, because, inter alia, they may comprise surfactant additives that may fail to satisfy the aquatic toxicity and/or biodegradability requirements that may be imposed in these regions.

SUMMARY OF THE INVENTION

The present invention relates to subterranean fluids having improved environmental characteristics, and more particularly, to subterranean fluids comprising a hydraulic cement and an invert emulsion, and methods of using such fluids in subterranean operations.

An example of a method of the present invention is a method of using a fluid in a subterranean formation comprising the step of introducing a fluid comprising a hydraulic cement and an invert emulsion of an oleaginous fluid, a nonoleaginous fluid, and an emulsifying surfactant into the formation, wherein the emulsifying surfactant: has an $LC_{50}$ or $EC_{50}$ that is greater than about 10 milligrams/liter with respect to *Skeletonema costatum, Acartia tonsa, Scopthalmus maximus* (juvenile), or *Corophium volutator*; and demonstrates a biodegradability of: greater than about 70% biodegradation in 28 days when tested according to method OECD 301A or 301E; or greater than about 60% biodegradation in 28 days when tested according to method OECD 301B, 301C, 301F, or 306.

An example of a composition of the present invention is a fluid comprising a hydraulic cement and an invert emulsion of an oleaginous fluid, a nonoleaginous fluid, and an emulsifying surfactant, wherein the emulsifying surfactant: has an $LC_{50}$ or $EC_{50}$ that is greater than about 10 milligrams/liter with respect to *Skeletonema costatum, Acartia tonsa, Scopthalmus maximus* (juvenile), or *Corophium volutator*, and demonstrates a biodegradability of: greater than about 70% biodegradation in 28 days when tested according to method OECD 301A or 301E; or greater than about 60% biodegradation in 28 days when tested according to method OECD 301B, 301C, 301F, or 306.

The features and advantages of the present invention will be readily apparent to those skilled in the art upon a reading of the description of the preferred embodiments which follows.

DETAILED DESCRIPTION OF EMBODIMENTS

The present invention relates to subterranean fluids having improved environmental characteristics, and more particularly, to subterranean fluids comprising a hydraulic cement and an invert emulsion, and methods of using such fluids in subterranean operations.

The subterranean well fluids of the present invention generally comprise a hydraulic cement and an invert emulsion that comprises an oleaginous fluid, a nonoleaginous fluid, and an emulsifying surfactant. Other additives suitable for use in subterranean formations also may be added to these well fluids, if desired. Generally, an invert emulsion is present in a well fluid of the present invention in an amount in the range of from about 20% to about 60% by weight of the well fluid. In certain embodiments, an invert emulsion is present in a well fluid of the present invention in an amount in the range of from about 30% to about 55% by weight of the well fluid. In certain embodiments, the subterranean well fluids of the present invention have a density in the range of from about 11 to about 17 pounds per gallon.

Generally, a broad variety of oleaginous fluids may be suitable with the subterranean well fluids of the present invention. In certain embodiments of the present invention, the oleaginous fluids that may be used may be any nonaqueous fluid that can be emulsified. An example of an oleaginous fluid that may be used in certain embodiments of the present invention is a mixture of long chain hydrocarbons that is commercially available from the ExxonMobil Corporation under the trade name "ESCAID 110." In certain embodiments of the present invention wherein the subterranean well fluids of the present invention demonstrate improved environmental characteristics, the oleaginous fluid that may be used with the subterranean well fluids of the present invention may be any oleaginous fluid that (a) demonstrates greater than about 60% biodegradation in 28 days when tested according to method OECD 306; and (b) has an $LC_{50}$ that is greater than about 10 milligrams per kilogram of dry sediment with respect to *Corophium volutator*. In certain preferred embodiments of the present invention wherein the subterranean well fluids of the present invention demonstrate improved environmental characteristics, an oleaginous fluid may be used that comprises a blend of $C_{10}$–$C_{18}$ normal alkanes, primarily $C_{13}$–$C_{15}$ normal alkanes, which is commercially available under the trade designation "XP-07" from Petrochem Carless, U.K. Generally, an oleaginous fluid may be present in a well fluid of the present invention in an amount in the range of from about 40% to about 70% by volume of the invert emulsion. In certain preferred embodiments of the present invention, an oleaginous fluid is present in a well fluid of the present invention in an amount in the range of from about 45% to about 55% by volume of the invert emulsion.

Nonoleaginous fluids used in the subterranean well fluids of the present invention may be any suitable aqueous fluid including, but not limited to, fresh water, salt water (e.g., water containing one or more salts dissolved therein), brine (e.g., saturated salt water), or seawater. Generally, a suitable nonoleaginous fluid may be from any source provided that it does not contain an excess of compounds, e.g., dissolved inorganics, that may adversely affect other components in the cement composition. The nonoleaginous fluid may be present in an amount sufficient to form a pumpable slurry. More particularly, a nonoleaginous fluid is present in a well fluid of the present invention in an amount in the range of from about 30% to about 60% by volume of the invert emulsion. In certain preferred embodiments, a nonoleaginous fluid is present in a well fluid of the present invention in an amount in the range of from about 45% to about 55% by volume of the invert emulsion.

The emulsifying surfactant used in the well fluids of the present invention for emulsifying the oil with the water source generally comprises an ether carboxylic acid that is commercially available from Cognis Deutschland GmbH & Co. KG under the trade name "HA 969." Generally, the emulsifying surfactant may be present in the invert emulsion in an amount in the range of from about 1% to about 5% by weight of the oil. In certain preferred embodiments, the emulsifying surfactant may be present in the invert emulsion in an amount in the range of from about 1% to about 3% by weight of the oil. The HA 969 emulsifying surfactant has been shown to demonstrate desirable aquatic toxicity values, e.g., the HA 969 emulsifying surfactant has an $LC_{50}$ or $EC_{50}$ that is greater than about 10 milligrams/liter with respect to *Skeletonema costatum*, has an $LC_{50}$ that is greater than about 10 milligrams/liter with respect to *Acartia tonsa* and *Scopthalmus maximus* (juvenile), and has an $LC_{50}$ that is greater than about 10 milligrams per kilogram of dry sediment with respect to *Corophium volutator*. Additionally, the HA 969 emulsifying surfactant has been shown to demonstrate desirable biodegradation properties, e.g., the HA 969 emulsifying surfactant demonstrates greater than about 60% aerobic biodegradation in 28 days when tested according to OECD 306.

Any hydraulic cement suitable for use in subterranean applications may be used in the well fluids of the present invention. A variety of hydraulic cements are suitable for use, including those comprising calcium, aluminum, silicon, oxygen, and/or sulfur, which may set and harden by reaction with water. Such hydraulic cements include, but are not limited to, Portland cements, pozzolanic cements, gypsum cements, high alumina content cements, silica cements, and high alkalinity cements. In certain preferred embodiments, the hydraulic cement is a Portland cement. Generally, the hydraulic cement is present in the well fluids of the present invention in an amount in the range of from about 25% to about 60% by weight of the well fluid. In certain preferred embodiments, the hydraulic cement is present in the well fluids of the present invention in an amount in the range of from about 50% to about 60% by weight of the well fluid.

Alternatively, the hydraulic cement may comprise Class C or equivalent fly ash. As referred to herein, the term "fly ash" refers to the finely divided residue that results from the combustion of ground or powdered coal and is carried by the flue gases generated thereby. ASTM Class C or equivalent fly ash contains both silica and calcium, and when mixed with water forms a cementitious mixture that sets into a hard impermeable mass, e.g., calcium silicate hydrate. In certain other embodiments of the present invention, the hydraulic cement may comprise a source of calcium ion along with vitrified shale or Class F or equivalent fly ash. Where the hydraulic cement comprises vitrified shale or fly ash, the hydraulic cement generally is present in the well fluids of the present invention in an amount in the range of from about 50% to about 70% by weight of the well fluid; in certain other embodiments, the hydraulic cement may be present in an amount in the range of from about 55% to about 65% by weight of the well fluid: ASTM Class F fly ash does not contain a reactive form of calcium, and an external source of calcium ion generally is required for it to form a cementitious composition with water. Generally, hydrated lime may be mixed with Class F or equivalent fly ash in an amount in the range of from about 5% to about 50% by weight of the fly ash. As referred to herein, the term "hydrated lime" will be understood to mean calcium hydroxide ($Ca(OH)_2$). Where fly ash is used as the hydraulic cement, certain preferred embodiments use ASTM Class F fly ash together with hydrated lime. Where the hydraulic cement comprises vitrified shale, a source of calcium ion such as hydrated lime generally is required for it to form a cementitious composition with water. An example of a suitable vitrified shale is commercially available under the trade name "PRESSUR-SEAL® FINE LCM" from TXI Energy Services, Inc., in Houston, Tex. An example of a suitable hydrated lime is commercially available from Continental Lime, Inc., of Salt Lake City, Utah.

Optionally, the well fluids of the present invention may comprise an organophilic clay. An example of a suitable organophilic clay is commercially available under the trade name "CLAYTONE II" from Southern Clay Products, Inc., of Princeton, N.J. Generally, the organophilic clay may be present in the well fluids of the present invention in an amount in the range of from about 0.01% to about 2% by weight of the invert emulsion. In certain embodiments, the organophilic clay may be present in the well fluids of the present invention in an amount in the range of from about 0.25% to about 0.6% by weight of the invert emulsion.

Optionally, the well fluids of the present invention may further comprise other additives as deemed appropriate by one skilled in the art with the benefit of this disclosure. Examples of such additives include, inter alia, fluid loss control additives, salts, fumed silica, set retarders, weighting agents, microspheres, defoaming agents, and the like. Examples of suitable set retarders are commercially available from Halliburton Energy Services, Inc., of Duncan, Okla., under the trade names "HR®-5," "HR®-15," "HR®-25," and "SCR-100."

The well fluids of the present invention may be prepared in a variety of ways. Generally, the well fluids may be prepared by dispersing the emulsifying surfactant (and, optionally, an organophilic clay) into the oil, then adding water at low shear. The resulting mixture then may be subjected to high shear, inter alia, to form an emulsion. Afterwards, any dry-blended materials, such as the hydraulic cement, may be added.

The well fluids of the present invention do not significantly increase in gel strength over time, and generally are displaced easily after being static in the well bore for a long period of time, e.g., a time period of about one week or more. The invert emulsions formed within certain embodiments of the well fluids of the present invention may be stable for a period of time up to about 3 weeks, thereby, inter alia, permitting the invert emulsion to be prepared as a separate component of the well fluid and sent to a job site far in advance of its use. This stability may permit any unused portion of the invert emulsions to be returned, and re-used in a subsequent operation, without necessitating disposal. The well fluids of the present invention may possess desirable environmental characteristics that may facilitate compliance with environmental regulations in a variety of regions.

In one embodiment, the well fluids of the present invention may be used to at least partially displace an oil-based drilling fluid resident within a well bore drilled to total depth where the oil-based drilling fluid has not yet gained significant gel strength. Displacement of the oil-based drilling fluid is achieved by the well fluids of the present invention because, inter alia, the oil-based drilling fluid has not had a chance to increase in static gel strength due to its constant circulation through equipment such as the drill pipe, drill bit, and pumps. Generally, the well fluids of the present invention may displace the oil-based drilling fluid to a level above those portions of the well bore containing fractures and other permeable areas or zones. After the well bore has been at least partially filled with a well fluid of the present invention, a pipe string to be cemented may be placed into the well bore. Some amount of oil-based drilling fluid may be present within the pipe string during this time. When a well cement composition is pumped through the pipe string into the annulus, it readily displaces the fluids within the pipe string and annulus. Any amount of the well fluids of the present invention that may remain in fractures or other permeable areas or zones in the well bore after the annulus has been filled with the well cement composition ultimately will set therein, due to, inter alia, the ability of the well fluids to develop compressive strength upon setting, thereby preventing the undesirable entry or flow of formation fluids in the annulus. In certain embodiments of the present invention where the casing is subjected to an internal pressure test after the well cement composition has set—which pressure test could potentially crack a portion of the set well cement composition—the presence of a portion of the well fluids of the present invention post-cementing in fractures or other permeable areas within the well bore may permit the portion of the well fluid to flow into the cracks within the cement and set therein, thereby enhancing the integrity of the set well cement composition.

In another embodiment, the well fluids of the present invention may be used in connection with the installation of expandable casing. For example, expandable casing may be placed within a well bore comprising a well fluid of the present invention, after which the expandable casing may be expanded out, and the well fluid of the present invention may be permitted to set. Optionally, a cementing plug may be displaced into the casing so as, inter alia, to displace the portion of the well fluid resident within the casing before the well fluid sets. Alternatively, after permitting the well fluid of the present invention to set, the portion of the well fluid within the casing may be drilled out.

While a number of preferred embodiments described herein relate to subterranean well cementing, it is understood that the well fluids of the present invention also may be used as, inter alia, spacer fluids. As referred to herein, the term "spacer fluid" will be understood to mean a fluid placed within a well bore to separate other fluids, e.g., to separate a drilling fluid within the well bore from a cement composition that subsequently will be placed within the well bore.

An example of a fluid composition of the present invention comprises: 100 grams of XP-07, 2 grams of HA 969, 2 grams of organophilic clay, 130 grams of water, and 300 grams of Class H cement.

An example of a method of the present invention is a method of using a fluid in a subterranean formation comprising the step of introducing a fluid comprising a hydraulic cement and an invert emulsion of an oleaginous fluid, a nonoleaginous fluid, and an emulsifying surfactant into the formation, wherein the emulsifying surfactant: has an $LC_{50}$ or $EC_{50}$ that is greater than about 10 milligrams/liter with respect to *Skeletonema costatum, Acartia tonsa, Scopthalmus maximus* (juvenile), or *Corophium volutator*; and demonstrates a biodegradability of: greater than about 70% biodegradation in 28 days when tested according to method OECD 301A or 301E; or greater than about 60% biodegradation in 28 days when tested according to method OECD 301B, 301C, 301F, or 306.

To facilitate a better understanding of the present invention, the following examples of preferred embodiments are given. In no way should such examples be read to limit, or to define, the scope of the invention.

EXAMPLE 1

Compressive strength testing was performed on a sample composition that was prepared as follows. First, 100 grams of XP-07 were provided. To the XP-07 were added 2 grams of HA 969 and 2 grams of an organophilic clay. Next, 130 grams of water were added at high shear to form an invert emulsion. Next, 300 grams of Class H cement were added to the invert emulsion, and the resulting mixture was placed in a water bath at 160° F. One portion of the sample composition remained in the water bath for six days before it was removed and subjected to compressive strength testing per API Recommended Practice 10B. After six days, this portion of the sample composition was determined to have 40 psi compressive strength. Another portion of the sample composition remained in the water bath for twelve days before it was removed and tested per API Recommended Practice 10B. After twelve days, this portion of the sample composition was determined to have 85 psi compressive strength.

Accordingly, the above example demonstrates that the well fluids of the present invention may be suitable for use in subterranean formations.

EXAMPLE 2

Gel strength testing was performed on a sample composition that was prepared as follows. First, 100 grams of XP-07 were provided. To the XP-07 were added 2 grams of HA 969 and 2 grams of an organophilic clay. Next, 130 grams of water were added at high shear to form an invert emulsion. Next, 300 grams of Class H cement and 2.1 grams of HR®-5 were added to the invert emulsion, and the resulting mixture was placed in a water bath at 160° F. The sample composition remained in the water bath for seven days before it was removed and subjected to static shear strength testing per Appendix A, API Recommended Practice 13B-2 (2d. ed. Dec. 1, 1991). After seven days, the sample composition was determined to have less than 250 pound/100 ft$^2$ gel strength. The sample composition then was returned to the water bath. On the ninth day, the sample composition set.

Accordingly, the above example demonstrates that the well fluids of the present invention may be suitable for use in subterranean formations.

Therefore, the present invention is well adapted to carry out the objects and attain the ends and advantages mentioned as well as those which are inherent therein. While the invention has been depicted and described by reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of using a fluid in a subterranean formation comprising the step of introducing a fluid comprising a hydraulic cement and an invert emulsion of an oleaginous fluid, a nonoleaginous fluid, and an emulsifying surfactant into the formation, wherein the emulsifying surfactant:
   comprises an ether carboxylic acid;
   has an $LC_{50}$ or $EC_{50}$ that is greater than about 10 milligrams/liter with respect to *Skeletonema costatum, Acartia tonsa, Scopthalmus maximus* (juvenile), or *Corophium volutator*; and
   demonstrates a biodegradability of:
      greater than about 70% biodegradation in 28 days when tested according to method OECD 301A or 301E; or
      greater than about 60% biodegradation in 28 days when tested according to method OECD 301B, 301C, 301F, or 306.

2. The method of claim 1 wherein the fluid is used as a well fluid.

3. The method of claim 2 wherein the well fluid is selected from the group consisting of spacer fluids and cementing compositions.

4. The method of claim 2 wherein the well fluid is a cementing composition.

5. The method of claim 2 wherein the subterranean formation comprises a well bore comprising an oil-based drilling fluid, further comprising the step of permitting the well fluid to displace at least a portion of the oil-based drilling fluid.

6. The method of claim 5 further comprising the step of placing a pipe string having a length into the well bore.

7. The method of claim 6 further comprising the steps of:
   placing a cement composition into the well bore; and
   permitting it to set therein.

8. The method of claim 6 wherein the pipe string comprises an expandable tubular, further comprising the steps of:
   expanding the length of expandable tubular; and
   permitting the well fluid to set.

9. The method of claim 7 further comprising the step of displacing a plug within the casing to displace a portion of well fluid within the casing before the portion of well fluid sets.

10. The method of claim 1 wherein the invert emulsion is present in the fluid in an amount in the range of from about 20% to about 60% by weight.

11. The method of claim 1 wherein the fluid has a density in the range of from about 11 to about 17 pounds per gallon.

12. The method of claim 1 wherein the oleaginous fluid comprises a mixture of long chain hydrocarbons.

13. The method of claim 1 wherein the oleaginous fluid:
   demonstrates greater than about 60% biodegradation in 28 days when tested according to method OECD 306; and
   has an $LC_{50}$ that is greater than about 10 milligrams per kilogram of dry sediment with respect to *Corophium volutator*.

14. The method of claim 1 wherein the oleaginous fluid comprises a blend of $C_{10}$–$C_{18}$ normal alkanes.

15. The method of claim 1 wherein the oleaginous fluid is present in the fluid in an amount in the range of from about 40% to about 70% by volume of the invert emulsion.

16. The method of claim 1 wherein the nonoleaginous fluid comprises water.

17. The method of claim 16 wherein the water is present in an amount sufficient to form a pumpable slurry.

18. The method of claim 16 wherein the water is present in an amount in the range of from about 30% to about 60% by volume of the invert emulsion.

19. The method of claim 1 wherein the emulsifying surfactant is present in the well fluid in an amount in the range of from about 1% to about 5% by weight of the oleaginous fluid.

20. The method of claim 1 wherein the hydraulic cement is present in the fluid in an amount in the range of from about 25% to about 60% by weight of the fluid.

21. The method of claim 20 wherein the hydraulic cement comprises a Portland cement.

22. The method of claim 1 wherein the hydraulic cement comprises ASTM Class C fly ash, a mixture of ASTM Class F fly ash and hydrated lime, a mixture of vitrified shale and hydrated lime, or mixtures thereof.

23. The method of claim 22 wherein the hydraulic cement is present in an amount in the range of from about 50% to about 70% by weight of the fluid.

24. The method of claim 1 further comprising an oil viscosifier.

25. The method of claim 24 wherein the oil viscosifier is an organophilic clay.

26. The method of claim 24 wherein the oil viscosifier is present in an amount sufficient to provide a fluid having a desired viscosity.

27. The method of claim 24 wherein the oil viscosifier is present in an amount in the range of from about 0.01% to about 2% by weight of the invert emulsion.

28. The method of claim 1 further comprising a fluid loss control additive, a salt, fumed silica, a set retarder, a weighting agent, microspheres, a defoaming agent, or a mixture thereof.

* * * * *